No. 77,739.
G. G. KNOWLES.
HAY SPREADER.
PATENTED MAY 12, 1868.
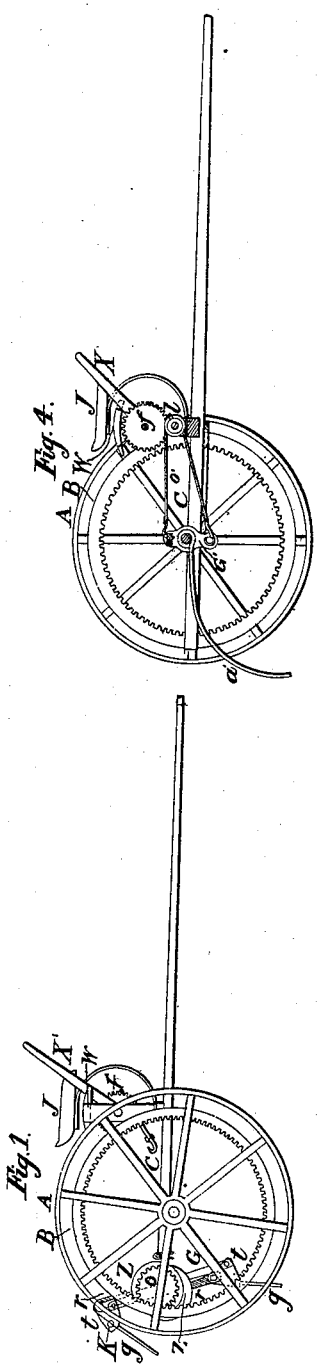
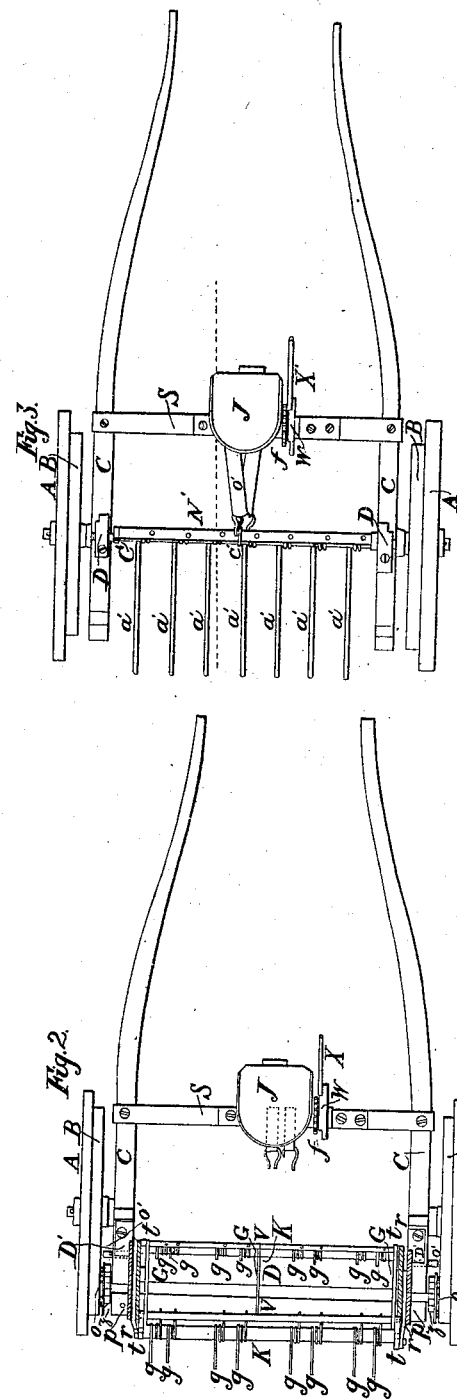
Witnesses:
Alexander Babcock
Hazard G. Knowles
Inventor:
George G. Knowles

United States Patent Office.

GEORGE G. KNOWLES, OF WAKEFIELD, RHODE ISLAND.

*Letters Patent No. 77,739, dated May 12, 1868.*

IMPROVEMENT IN HAY-SPREADERS.

*The Schedule referred to in these Letters Patent and making part of the same.*

TO ALL WHOM IT MAY CONCERN:

Be it known that I, GEORGE G. KNOWLES, of Wakefield, in the county of Washington, and State of Rhode Island, have invented a new and useful Improvement in Machines for Stirring and Raking Hay; and I do hereby declare the following to be a full and correct description thereof, reference being had to the accompanying drawings, and to the letters marked thereon—

The same letters referring to like parts in all the figures.

Figure 1 is a side elevation of the machine when used as a tedder.

Figure 2 is a top view of the same.

Figure 3 is a top view of the machine when used as a horse-rake.

Figure 4 is a vertical section of the same, taken through in the direction of red line, fig. 3.

The construction is as follows: The two wheels A A are placed on short axles secured to the two side-bars C C, which are extended out in front to form the thills; and a cross-bar, S, is put across from one to the other to hold them together, and to hold the driver's seat J, with the arrangements to operate the rake by. The tedder-reel consists of a shaft, D, lying in bearings at the back ends of the bars C C, and having three cross-bars G G G, which form the arms of the reel, fastened to it.

The bars V V are put in bearings in the ends of the arms, and have secured on their outer ends, four segment-wheels or triangular pieces $t\ t\ t\ t$, which hold the rods K K, around which the teeth $g\ g\ g$ are coiled, their inner ends being held by the bars V V. To the other corners of the triangles $t\ t$ are secured the ends of the eccentric-plates $r\ r\ r\ r$, which are on the eccentrics $z\ z$, fastened to the plates $p\ p$. The plates $p\ p$, are fastened to the bars C C, by the pins $o'\ o'$, and kept down in place, when in operation, by the buttons D' D'. By turning back the buttons, the shaft and reel may be raised out of place, so as to be out of gear when driving to the field. Two gear-wheels O O are placed on the ends of the reel-shaft D, and mesh into the two internal gear-wheels B B, fastened on the inside of the driving-wheels A A.

The wheels O O are loose on the reel-shaft, but are made to turn it in one direction by means of the ratchet-wheels $z'\ z'$, and their pawls.

When used as a rake, the tedder-reel is taken out by removing the pins $o'\ o'$, and the shaft C' is placed in the bearings over the axles, and is held down in place by the buttons D' D'. Around this shaft the spring-teeth $a'\ a'\ a'$ are coiled, and one end of them secured to the bar N. A short cross-plate, $c'$, is fastened to the middle of the shaft C', to the ends of which are hooked the ends of the strap $c''$, which is fastened around a roll, $l$, under the driver's seat, where it is controlled by a gear-wheel, $f$, meshing into a smaller gear on the roll. A lever, $x'$, fastened to the wheel $f$ is used to operate the roll by, so that by moving the lever back and forward, the roller will draw the strap one way and the other, and raise or lower the rake-teeth from the ground. On the frame, by the side of the seat J, are catches W, to hold the lever when moved to place.

The operation of the rake is this: Being drawn forward over the field, with the lever $x'$ in the front notch on the catch W, the teeth will be held down to catch the hay; but when the rake is as full as desired, the driver, by pulling the lever $x'$ back to the rear notch, raises the teeth of the rake, and releases the hay collected by them.

The operation of the tedder is as follows: When the machine is drawn over the grass, the driving-wheels A A drive the reel around, by means of the gear-wheels B and O. When the bars with the teeth are down, the teeth are held in a vertical position to catch the grass, and stir it as they rise; but when the teeth are at the top, they are in a horizontal position, to free them from the grass. These different positions are produced by means of the eccentrics, and their plates, which turn the triangular pieces down as the teeth rise.

Having described my hay-tedder and rake, what I claim as my invention, and desire to secure by Letters Patent, is—

The combination of the eccentric-plates $r\ r\ r\ r$, with the triangles $t\ t\ t\ t$, and bars K, V, as and for the purpose herein described.

GEORGE G. KNOWLES.

Witnesses:
   HAZARD G. KNOWLES,
   ALEXANDER BABCOCK.